United States Patent [19]
Cain et al.

[11] Patent Number: 5,908,654
[45] Date of Patent: *Jun. 1, 1999

[54] TRIGLYCERIDES RICH IN POLYUNSATURATED FATTY ACIDS

[75] Inventors: Frederick William Cain, Voorburg, Netherlands; Gerald Patrick McNeill, Rushden; Stephen Raymond Moore, Thrapston, both of United Kingdom

[73] Assignee: Loders-Croklaan B.V., Wormerveer, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/638,743

[22] Filed: Apr. 29, 1996

[30] Foreign Application Priority Data

Apr. 28, 1995 [EP] European Pat. Off. .............. 95302944

[51] Int. Cl.$^6$ ..................................................... A23D 7/00
[52] U.S. Cl. ............................................ 426/603; 426/607
[58] Field of Search .................................... 426/606, 607, 426/603

[56] References Cited

U.S. PATENT DOCUMENTS 5,151,291  9/1992  Tokairin et al. ........................ 426/581

FOREIGN PATENT DOCUMENTS

| 0 265 699 | 5/1988 | European Pat. Off. ........... C11C 3/08 |
| 0 271 909 | 6/1988 | European Pat. Off. ....... A61K 31/23 |
| 0 298 293 | 1/1989 | European Pat. Off. . |
| 0 321 777 | 6/1989 | European Pat. Off. ........... C12P 7/64 |
| 0 609 001 A3 | 8/1994 | European Pat. Off. ....... A61K 32/23 |

WO 94/24889  11/1994  WIPO .............................. A23L 1/30

OTHER PUBLICATIONS

Gunstone 1983 Lipids in Foods Chemistry, Biochemistry and Technology pp. 147, 152–155 Pergamon Press New York.
Adachi et al, Journal of Fermentation and Bioengineering, vol. 75, No. 4, (1993), pp. 259–264.
Tanaka et al, JAOCS, vol. 71, No. 3, (Mar., 1994), pp. 331–334.
Pedersen et al, JAOCS, vol. 72, No. 2, (1995), pp. 239–243.
Endo et al, Bioscience Biotechnology Biochemistry, vol. 57, No. 12, (1993), pp. 2202–2204.
Toyoshima et al, Journal of the Japan Oil Chemists' Society, vol. 42, No. 1, (1993) pp. 30–35.
Huang et al., "Lipase–Catalyzed Incorporation of n–3 Polyunsaturated Fatty Acids into Vegetable Oils," JAOCS, vol. 71, No. 11, pp. 1277–1280, 1994.
Patent Abstracts of Japan, vol. 17, No. 429, 1993.

*Primary Examiner*—Carolyn Paden
*Attorney, Agent, or Firm*—Pillsbury Madison & Sutro LLP

[57] ABSTRACT

Triglycerides, having at least two long chain polyunsaturated fatty acids $L_1$ and $L_2$, from which at least one is present for more than 20 wt %, while the weight ratio $L_1:L_2$ is at least 2 and which triglycerides also contain at least 15 wt % of saturated fatty acids with 14 or more carbon atoms and have a weight ratio saturated $C_{18}$:saturated $C_{16}$ fatty acid residue of >2, while at least 5 wt % of the saturated fatty acid residues with at least 14 C-atoms is bonded on a triglyceride molecule, wherein also $L_1$ and/or $L_2$ is present, display a number of beneficial properties (good oxidative stability healthier, less off-flavor, lower caloric, better digestibility, and in particular better structuring properties).

17 Claims, No Drawings

TRIGLYCERIDES RICH IN POLYUNSATURATED FATTY ACIDS

BACKGROUND OF THE INVENTION

According to EP 265 699 fats with a superior digestibility and absorptivity are obtained, when these fats are composed of triglycerides having a specific amount of $C_8$ to $C_{14}$ fatty acid residues at the 2-position, while residues with $C_{18}$ or higher fatty acids are bonded at the 1.3-positions. Typical examples of the $C_{18}$ and higher fatty acids are polyunsaturated fatty acids, such as arachidonic acid, eicosapentenoic acid and dodecahexenoic acid. However nothing is disclosed about fat compositions that combine in the fat saturated fatty acid residues and at least two different long chain polyunsaturated fatty acid residues and that have structering properties. In WO 90/04012 it is disclosed that triglycerides that contain saturated $C_8/C_{10}$ fatty acid residues in 1.3 and simultaneously a polyunsaturated fatty acid residue (in particular DHA) in the 2-position, have beneficial nutritional properties, in particular for enteral or parenteral purposes. However again, nothing is disclosed about fat compositions that contain in the fat specific amounts of saturated and two different polyunsaturated fatty acid residues and that have structering properties.

From WO 94/00044 it is known that fatblends that contain unhardened fish oil have significant health benefits. Fish oil often contains appreciable amounts of two different polyunsaturated fatty acids, e.g. DHA and EPA. However it is also known that fish oil has a number of draw backs. A particular disadvantage of fish oils being that they do not have structuring properties, which makes it difficult to apply them in fat compositions wherein a structuring agent is required in order to give the fat composition a performance, that is desired to make the fat applicable in foodproducts.

Toyoshima c. s. disclosed in Journ. of the Japan Oil chem Soc 42 (11), 1993, pages 30–35 a transesterification process, applying Mucor miehei as enzyme of a fish oil, such as sardine oil, EPA concentrated oil or DHA concentrated oil with polyunsaturated fatty acids. This resulted in triglycerides with about 62% of PUFA in it. It is further disclosed that EPA was incorporated more easily than DHA. Therefore triglycerides high in DHA were made by an additional transesterification in the fish oil/PUFA system. This document therefore does not disclose triglycerides rich in a first LCPUFA and containing a second LCPUFA in a weight ratio of >2, which triglycerides further contain saturated $C_{14+}$ fatty acids.

Endo in Bioscience Biotechn Biochem 57 (12) 1993, pages 2202–2204 discloses that sardine oil can be stabilized by interesterification with saturated or mono-unsaturated fatty acids. However, the effects with stearic acid are very low. As a result of the enzymic interesterification the total amount of LCPUFA in sardine oil (was 20%) decreased to 17.5 wt % if stearic acid groups were introduced. Therefore, this document does not teach triglycerides rich in a first LCPUFA and also containing a second LCPUFA in a ratio of >2, while also at least 15 wt % $C_{14+}$ saturated fatty acids were present in the triglycerides.

From U.S. Pat. No. 5,151,291 can be concluded that triglycerides, rich in EPA with good properties to make them suitable for margarine applications can be obtained by a process wherein EPA-ester is converted with a ""higher fatty acid"" triglyceride. Higher fatty acid triglycerides are defined as saturated or unsaturated $C_{14+}$ fatty acid triglyceride.

They include palmitic, stearic but also oleic, linoleic, EPA and DHA. However, this method will never result in triglycerides containing two different LCPUFA's in a ratio of >2, while simultaneously saturated $C_{14+}$ fatty acid will be present. Moreover this document does not disclose the impact of the $C_{18:0}/C_{16:0}$-ratio in the products on the structurering properties of the fats.

EP 271,909 discloses triglycerides, wherein simultaneously three different fatty acid residues are present. These residues are selected from $C_{20}$–$C_{22}$ saturated or (poly) unsaturated fatty acids; $C_{14}$–$C_{18}$ saturated or unsaturated fatty acids and $C_6$–$C_{12}$ saturated or unsaturated fatty acids. The products never comprise two different LCPUFA's in a ratio of >2 in combination with >15 wt % saturated $C_{14+}$ fatty acid.

SUMMARY OF THE INVENTION

We have performed a study to find out, whether fat compositions existed, that could overcome the draw backs of the known fat compositions, while they would retain the beneficial effects of the presence of relatively high amounts of polyunsaturated fatty acids. This study has resulted in the finding of novel fats, that combine the following beneficial product properties:

our novel fats display an oxidation stability which is not lower than for known triglycerides with similar compositions, but not having our levels of specific saturated fatty acids present;

our novel fats are better for the development of the brain, in particular when consumed by infants. This effect is due to the relatively high levels of dodecahexenoic acid (DHA) in our fats;

our novel fats also can contain relatively high levels of eicosapentenoic acid (EPA), which makes our fats healthier, due to the effect of EPA on coronary diseases;

our novel fats, containing $C_{16}/C_{18}$ saturated fatty acids in our specific ratio's display better flavour characteristics than the fats containing $C_{14}$ saturated fatty acids; this is due to the fact that $C_{14}$ leads to a faster hydrolysis and thus to the development of a quicker off-taste than $C_{16}/C_{18}$;

our novel fats, containing relating high levels of $C_{18}$ saturated fatty acid residues, display a lower calorific behaviour. This is due to the fact that $C_{18}$ saturated fatty acid, displays a reduced fat absorption by the body and thus displays a decreased digestibility. This is also the reason why the fats, based on $C_{18}$ saturated fatty acids are healthier than the fats based on $C_{14}$ or $C_{16}$ saturated fatty acids.

our fats, based on $C_{18}$-saturated fatty acids will also be healthier due to cholesterol lowering effects over $C_{14}$ and $C_{16}$ acids;

our novel fats with the specific $C_{18:0}/C_{16:0}$ display better structuring properties than fats with lower levels of $C_{18:0}$ and higher levels of $C_{16:0}$;

our novel fats can be obtained as a result of interesterification reactions, in particular enzymic interesterification, which results in fats with a better triglyceride-distribution than known fats. Simultaneously these fats will display an improved melting behaviour as our fats will hardly contain any trisaturated triglycerides.

So our invention concerns with novel fats, that display one or more of above beneficial effects. Our novel fats can be described as a triglyceride-composition, comprising at least two long chain poly-unsaturated fatty acids $L_1$ and $L_2$, both having at least 3 unsaturations and having at least 20"

carbon atoms from which $L_1$ is the most abundant and $L_2$ is the second most abundant, wherein the triglyceride composition contains at least 20 wt % of $L_1$, while the weight ratio $L_1:L_2$ is at least 2, and the triglyceride composition also contains at least 15 wt %, of saturated fatty acids with 14 or more carbon atoms, and wherein the weight ratio $C_{18:0}:C_{16:0}$ is >2, whereas at least 5 wt %, preferably at least 10 wt %, most preferably at least 20 wt % of the saturated $C_{14+}$ fatty acid residues is bonded on a triglyceride molecule, wherein at least $L_1$ and/or $L_2$ is present.

DETAILED DESCRIPTION OF THE INVENTION

Preferred fats are triglyceride compositions, wherein the amount of $L_1$ is more than 30 wt %. More preferred fats are the weight ratio $L_1:L_2$ is at least 3, while triglyceride compositions, wherein the amount of $L_1$ is at least 40 wt % and the weight ratio of $L_1:L_2$ is at least 3.5 are even more preferred.

The amount of saturated $C_{14+}$ fatty acids in our fats is preferably 15–50 wt %. It was found, that fats with relatively high levels of $C_{16}$–$C_{18}$ saturated fatty acids could be obtained. Advantageously the level of $C_{16}$–$C_{18}$ saturated fatty acids is more than 30 wt %, in particular more than 40 wt % if a good structuring fat is desired. If a healthier structuring fat is desired with better structering properties the amount of $C_{18}$ saturated fatty acid is more than 20 wt %, preferably more than 30 wt %.

Fats with the best structuring properties and health charateristics are obtained if the weight ratio of saturated $C_{18}$:saturated $C_{16}$ fatty acid residues is >2.

The most abundant polyunsaturated fatty acid $L_1$ is preferably DHA (=$C_{22:6}$). The second most abundant polyunsaturated fatty acid $L_2$ advantageously is EPA ($C_{20:5}$) Very useful triglycerides are obtained, when $L_1$=EPA and $L_2$=DHA.

Our triglycerides can be applied as such in foodproducts, however it can also be very suitable to blend our novel fats first, before applying them. Therefore part of our invention is also a blend of triglycerides, comprising
0.3–95 wt % of triglycerides, and
99.7–5 wt % of a complementary fat, having a solid fat index at 10° C. ($N_{10}$) that is either at least 5% more, or at least 5% less than the $N_{10}$ of the triglycerides.

Above blends suitably can be composed of 5–80 wt %, in particular 20–70 wt % of the triglycerides, and 95–20 wt %, in particular 80–30 wt % of the complementary fat.

Many types of complementary fat could be applied. However we prefer to use a complementary fat that has a solid fat content (NMR-pulse; not stabilized) of more than 15 at 20° C., preferably more than 20.

Very useful complementary fats for our blends can be selected from cocoa butter equivalents, cocoa butter, palm oil or fractions thereof, palmkernel oil or fractions thereof, interesterified mixtures of above fats or fractions or hardened components thereof, or from liquid oils, such as sunflower oil, high oleic sunflower oil, soyabean oil, rapeseed oil, cottonseed oil, safflower oil, high oleic safflower oil, maize oil, MCT oils, or fish oils.

The blends so obtained display a solid fat content (NMR-pulse; not stabilized) of 0–85, preferably 10–70, most preferably 20–60 at 5° C. and less than 30, preferably <20, most preferably <5 at 35° C.

Although our fats already have acceptable oxydative stabilities stability we found that this stability can be further improved when our blends contain an effective amount of an oxidation stabilizer, selected from the group consisting of: natural or synthetic tocopherols, other natural anti-oxidants, BHT, BHA, free radical scavengers, enzymes with antioxidant properties. Effective amounts can range from 100 ppm to 5 wt % (on fat).

Part of our invention are also the foodproducts, comprising a fat phase, in particular spreads and margarine. However our fats can also be used in cream alternative, infant food, chocolate, confectionery, bakery products, sauces, ice-creams, ice-cream coatings, cheese, soups, mayonnaise, dressings, enteral or parental products, wherein the fat phase contains a fat.

Our fats can be obtained by preparing the pure triglycerides and blending these in the required ratios.

However a very useful method for the preparation of our blends is an interesterification of a (non-hardened) fish oil with a saturated fatty acid. This interesterification can be performed by using an enzyme. In that case enzymes can be applied, that display a specificity for e.g. long chain polyunsaturated fatty acids over saturated fatty acids, or that display a preference for one long chain polyunsaturated fatty acid over another long chain polyunsaturated fatty acid.

In our example we have set out another possible interesterification method for the preparation of our novel fats. According to this method a fish oil is first subjected to glycerolysis in the presence of a lipase. The crude reaction product obtained is enriched in ling chain polyunsaturated fatty acids. This crude product is reconverted to triglycerides by performing an interesterification, using a fat high in e.g. $C_{16}$ or $C_{18}$ saturated fatty acids, such as hardened low erucic rape seed oil. Other routes for the preparation of our fats are illustrated by the other examples.

LIST OF USED CODES AND THEIR EXPLANATION wf(TUNA)f=TUNAf=The olein fraction of semi refined tuna oil obtained low temperature solvent fractionation, having at least 35% of DHA.
BO68=Hardened soyabean oil melting point 68° C.
POs=Dry fractionated palm oil stearine fraction.
CCB=Cocoa butter.
POf37=Partially hardened palm oil olein fraction melting point of 37° C.
CN=Coconut oil.
CNs=Coconut oil stearin fraction.
nPOm=Wet fractionated palm oil mid fraction.
df(PO)f=Dry fractionated palm oil olein fraction.
HS1=Hardstock=The stearin fraction of a chemical interesterrified blend of fully hardened palm oil and a fully hardened palm kernel olein fraction.
SF=Sunflower oil.
PO=Palm oil.
in=Interesterified.

EXAMPLE I

A fish oil enriched in 20:5 and 22:6 is prepared by reacting menhaden oil (composition given in table 1.) with glycerol in the presence of *Pseudomonas cepacia* lipase at a temperature of 37° C. The ratio of oil to glycerol is 3 (wt/wt) and the quantity of lipase is 1% by weight on oil. 5% water by weight is present in the glycerol. After 48 hours the reaction is terminated by heating to 100° C. and the glycerol is separated from the reaction mixture. The triglycerides are separated from the glyceride fraction by adsorption of the partial glycerides and the free fatty acids (FFA) onto silica, to give the enriched oil of composition shown in table 1. This oil is interesterified with hardened low erucic acid rapeseed oil (composition in table 1.) using *Rhizomucor miehei*, to give the final product oil with a composition given in table 1. All the above processes are carried out under nitrogen to prevent deterioration of the oil.

about the minimum amount which is bonded on the same triglyceride molecule with L1 and/or L2.

A statistical program was used to calculate a carbon number based on the randomized distribution of the fatty

TABLE 1

| | Fatty acid composition (wt%). | | | | | | | | |
|---|---|---|---|---|---|---|---|---|---|
| | C14:0 | C16:0 | C16:1 | C16:u | C18:0 | C18:1 | C18:2 | C18:3 | C18:4 |
| Original oil | 8.3 | 19.6 | 11.9 | 6.5 | 3.4 | 12.4 | 1.3 | 1.5 | 2.5 |
| Enriched oil | 0.3 | 4.3 | 6.7 | 3.8 | 1.5 | 16.9 | 1.8 | 1.7 | 3.5 |
| Hardened low erucic acid rapeseed oil (LEAR oil) | 0.0 | 4.0 | 0.0 | 0.0 | 94.0 | 0.0 | 0.0 | 0.0 | 0.0 |
| 75% enriched fish oil + 25% hardened LEAR oil | 0.2 | 4.2 | 5.0 | 2.8 | 24.6 | 12.7 | 1.3 | 1.3 | 2.6 |

| | C20:0 | C20:1 | C20:5 | C20:u | C22:0 | C22:1 | C22:5 | C22:6 | C22:u | C24:0 |
|---|---|---|---|---|---|---|---|---|---|---|
| Original oil | 0.8 | 0.3 | 14.5 | 3.6 | 0.0 | 0.3 | 2.5 | 6.5 | 1.3 | 0.0 |
| Enriched oil | 1.0 | 2.8 | 28.1 | 6.8 | 0.0 | 0.0 | 5.6 | 13.6 | 1.9 | 0.0 |
| Hardened low erucic acid rapeseed oil (LEAR oil) | 2.0 | 0.0 | 0.0 | 0.0 | 0.0 | 0.0 | 0.0 | 0.0 | 0.0 | 0.0 |
| 75% enriched fish oil + 25% hardened LEAR oil | 1.3 | 2.1 | 21.1 | 5.1 | 0.0 | 0.0 | 4.2 | 10.2 | 1.4 | 0.0 |

EXAMPLE II

A low temperature solvent fractionation at −70° C. was done on semi refined tuna oil with the composition, mentioned in table II, under the conditions as mentioned in "Progress in the chemistry of fats and other lipids" vol. 3 Holman R. T. et al 1955, using 4 L of acetone per Kg tuna oil to enrich the oil in DHA and EPA. After removal of the acetone the olein fraction of the tuna oil (=wf(tuna)f) with the composition, mentioned in table 2, was obtained. This fraction was stored in the freezer under nitrogen.

All the ingredients for the enzymic interesterification were stored at ambient for at least one hour. All oils were used as liquid oils. To the tuna oil olein fraction 400 ppm of anti-oxidant (BHT) was added.

The tuna oil olein fraction was divided in different portions. Then the liquid complementary fat was added to each of the tuna oil olein fractions and mixed in. A sample was taken for carbon number and FAME analyses. For the enzymic interesterification a 1,3 specific lipase (*Rhizomucor Miehei*) was used. The lipase was added to the mixed oils in a weight ratio of 40:1 oil:lipase. A nitrogen blanket was put over the mixture to prevent deterioration of the oil. The reaction mixture was put in a magnetic stirred heatblock and the temperature was adjusted to 60° C. After 96 hours the reaction was stopped.

The samples were cleaned through an alumina column to remove FFA, mono- and diglycerides. Carbon number and FAME analyses were done via GC on the samples before and after lipase treatment.

Two methods were used to prove that at least 5% of the total amount of C14+ was bonded on a triglyceride molecule with L1 and/or L2. The first method involves a calculation and gives the maximum amount which is bonded on a triglyceride molecule with L1 and/or L2. The second method which involves an analytical method gives some information acids in a triglyceride molecule. This program was checked by using the FAME results of a (random) chemical interesterification for a standard interesterified fat mix from palm oil stearin/palm kernel stearin and comparing the calculated carbon number profile with the measured carbon number profile (see table 3). The differences were very small so that it was concluded that the program gives the correct results. Then the enzymic interesterification according to the invention was tested. The FAME and carbon number of the enzymic interesterified product were measured. The measured carbon number was equated to the calculated carbon number and the differences were very small. Because of this we concluded that the enzymic interesterification resulted in a random distribution of the fatty acids in the triglyceride molecule. In a randomized interesterified product it is possible to calculate the amount of C14+ bonded on a triglyceride molecule with L1 and/or L2.

The second method is an analytical method. Two parts of the sample (Band a and Band b) with a certain amount of unsaturation were collected by using Silver-ion HPLC. Band A had about 6 till 9 unsaturations and Band B had 9 till 18 unsaturations. On the triglycerides of the two bands FAME and carbon number analyses were done.

From these FAME analyses a carbon number was calculated by using the statistical program. This carbon number was equated to the measured carbon number. From these analyses and calculations it was possible to calculate the minimum amount of C14+ which was bonded on a triglyceride molecule with L1 and/or L2. The actual amount will be even higher because there was more sample than just the two analyzed bands.

Interesterification experiments were done on the following blends:
70/20/5 wf(tuna)f/BO68/POs
70/20/5 wf(tuna)f/POs/BO68 (=comparative example)

The composition of BO68 and POs are given in table 2.

The experiments were done according to the method described above. The experiments were stopped after 96 hours. The carbon number and FAME of the blends and the interesterified blends were determined. The results of the FAME analyses are listed in table 4 and the results of the carbon number analyses are listed in table 5.

The results of the calculated amount of C14+ which is bonded on a triglyceride molecule with L1 and/or L2 are listed in table 6. The results of the analyzed amount of C14+ which is bonded on a triglyceride molecule with L1 and/or L2 are listed in table 7.

EXAMPLE III

Interesterification experiments were done on the following blends:
75/25 wf(tuna)f/BO68
75/25 wf(tuna)f/POs (comparative example)

The BO68 and POs are the same as in example II (see table 2).

The experiments were done according to the method described in example II. This tuna olein fraction was alumina treated to remove FFA, mono- and diglycerides, before lipase treatment. After 96 hours the experiments were stopped. The analyses of the reaction mixtures were done. The results of all these analyses are listed in tables 8 and 9.

The results of the calculated amount of C14+ which is bonded on a triglyceride molecule with L1 and/or L2 are listed in table 10. The results of the analyzed amount of C14+ which is bonded on a triglyceride molecule with L1 and/or L2 are listed in table 11.

Unstabilised N-values were measured on the reaction products as well. These were:

|          | in (wf(TUNA)f/BO68) | in (wf(TUNA)f/POs) |
|----------|---------------------|--------------------|
| N-10 n.s. | 14.4%              | 8.8%               |
| N-20 n.s. | 9.0%               | 6.9%               |
| N-30 n.s. | 4.6%               | 3.9%               |

EXAMPLE IV

A fish oil concentrate was made according to the following procedure.

1. Chemical Hydrolysis of Tuna Oil

Method adapted from Ratnayake et al (Fat Sci. Tech. 90 (10), 1988, page 381)

Tuna oil (200 g) was refluxed for 1 hour in an atmosphere of nitrogen with a mixture of 47 g of potassium hydroxide pellets, 260 mls ethanol (96%), and 88 mls deionised water. The saponified mixture was diluted with 500 mls of water and the non-saponifiable matter was extracted with hexane (3×100 ml). The aqueous layer was neutralised with 500 mls of 1 M HCl. The free fatty acids were extracted into hexane (3×100 ml). The hexane was removed by evaporation.

2. Urea Fractionation of Tuna Acids

Method adapted from Robles Medina et al JAOCS vol 72 no 5 (1995)

The fatty acids (100 g) were added with stirring to a hot (60° C.) solution of 400 g of Urea and 800 mls of ethanol. The mixture was stirred for 1 hour before the temperature was reduced by 1° C./hour to 4° C. at which temperature the mixture was held for 16 hours. The mixture was fractionated to remove the stearin fraction. The ethanol was removed from the olein fraction by evaporation. The olein was mixed with 250 mls of hexane and 250 mls of 1 M HCl. The hexane layer was isolated and the aqueous layer washed with a further 100 ml hexane. The hexane was removed by evaporation.

3. Recombination to Triglyceride Batch 1

47 g of Tuna acids were mixed with approximately 4 g of glycerol and 4 g of *Rhizomucor miehei* in a jacketed vessel at 55° C. with a magnetic stirrer. Nitrogen was allowed to blow over the surface to remove any water produced during the reaction. The reaction was allowed to continue for 10 days until the FFA had been substantially reduced. The product after removal of the enzyme by filtration was stirred at 60° C. with 50 g of basic alumina in 100 mls of hexane. The alumina was removed by filtration.

batch 2

The free fatty acids were divided into 4 samples which were recombined to triglyceride on 12 to 15 g scale in glass vials at 55° C. in a magnetic hot block. Typically 14 g of free fatty acid were mixed with 1.3 g glycerol and 0.7 g *Rhizomucor miehei*. Nitrogen was allowed to flow over the surface to remove water. The reactions were allowed to continue for 1 week. 50 g of product, after removal of the enzyme by filtration, was stirred at 60° C. with 270 g of basic alumina in 100 mls of hexane. The alumina was removed by filtration.

The oil from "Recombination to triglycerides" batch 1 was called D58. The FAME composition of D58 is given in table 12.

Interesterification experiment was done on the following blend:
75/25 fish oil concentrate (=D58)/BO68

The interesterification experiment was done according to the method of example II.

The interesterification experiment was stopped after 115 hours. The FAME and carbon number analysis were done, the results are listed in table 12 and 13.

The results of the calculated amount C14+ which is bonded on a triglyceride molecule with L1 and/or L2 of this sample is listed in table 14.

EXAMPLE V

The interesterification experiments were done according to the method of example II. This time the interesterification reactions were stopped after 46 hours.

The following interesterified blend was used: 75/25 wf(TUNA)f (=D40)/BO68

The FAME and carbon numbers of this interesterified mixture are listed in table 15 and 16.

D40 being a tuna oil olein fraction, obtained by low temperature solvent fractionation, having about 38 wt % of DHA.

EXAMPLE VI

Blends were made of the interesterified mixture mentioned in example V (=in(FISH)) and a complementary fat/fat blend for the following applications:

| Application | Reference | Blend inside the patent |
|-------------|-----------|-------------------------|
| Chocolate | Cocoa butter | Cocoa butter/in (FISH) 99/1 |
| Bakery | POf37/df(PO)f 40/60 | POf37/df(PO)f/in(FISH) 40/50/10 |

-continued

| Application | Reference | Blend inside the patent |
|---|---|---|
| Ice cream coatings | Coconut oil | CN/CNs/in(FISH) 90/5/5 |
| Ice cream | PO | PO/in(FISH) 90/10 |
| Non dairy creams | nPOm/df(PO)f 40/60 | nPOm/df(PO)f/in (FISH) 40/40/20 |
| Health margarines/ Health spreads | HS1/SF 13/87 | HS1/SF/in(FISH) 13/77/10 |
| Confectionery fillings | nPOm/df(PO)f 60/40 | nPOm/df(PO)f/in (FISH) 60/20/20 |
| Mayonnaise/ Sauces | SF | SF/in(FISH) 90/10 |
| Dressings | SF | SF/in(FISH) 90/10 |

The range of N-values of the references and measured N-values for the blends are listed in table 17.

EXAMPLE VII

The interesterification experiments were done according to the method of example II. This time the interesterification reactions were stopped after 48 hours.

The two following interesterified blends were used:
75/25 wf(TUNA)f/BO68
75/25 wf(TUNA)f/POs The FAME and carbon numbers of these interesterified mixture are listed in table 18 and 19.

EXAMPLE VIII

Spreads were made according to the following recipe:

| Fat Phase | |
|---|---|
| Fat Blend | 40% |
| Hymono 7804 | 0.3% |
| Colour (20% β-carotene) | 0.02% |
| Total | 40.32% |
| Aqueous Phase (to pH 5.1) | |
| Water | 56.44% |
| Skimmed Milk Powder | 1.5% |
| Gelatin (270 bloom) | 1.5% |
| Potassium Sorbate | 0.15% |
| Citric Acid Powder | 0.07% |
| Total | 59.66% |

In above recipe two different fat blends were applied. The fat blend according to the invention was as follows:
example VII in(wf(TUNA)f/BO68) according to
The fat blend used as comparative example was as follows: in(wf(TUNA)f/POs)

The FAME results of the in(wf(TUNA)f/BO68) and the in(wf(TUNA)f/POs) are listed in table 18.

The spreads were processed according to the following procedure:
2 kg of material was prepared and processed.
A micro-votator processing line was set up as follows:
Premix conditions—Stirrer Speed 60 rpm—Temperature 50° C.
pump—Proportioning pump set at 60% (30 g/min.).
$A_1$ conditions—Shaft speed 1000 rpm—Temperature set at 2° C.
$C_1$ conditions—Shaft speed 1000 rpm—Temperature set to 8° C.
$A_2$ conditions—Shaft Speed 1000 rpm—Temperature set to 0° C.
$C_2$ conditions—Shaft speed 1000 rpm—Temperature set to 8° C.

The aqueous phase was prepared by heating the required amount of water to approximately 80° C. and then, using a Silverson mixer, slowly mixing in the ingredients. The pH of the system was adjusted to 5.1 by adding 20% Lactic acid solution as required.

A premix was prepared by stirring the fat phase in the premix tank and then slowly adding in the aqueous phase. When addition was complete, the mix was stirred for a further 5 minutes before pumping through the line. When the process had stabilised (around 20 minutes), product was collected for storage and evaluation.

The process conditions for the spread of in(wf(TUNA)f/BO68) were as follows:

| Sample | $A_{1\ Exit}$ (° C.) | $C_{1\ Exit}$ (° C.) | $A_{2\ Exit}$ (° C.) | $C_{2\ Exit}$ (° C.) | Line Pressure bar |
|---|---|---|---|---|---|
| in (wf(TUNA)f/BO68) | 9.9 | 16.7 | 8.2 | 13.1 | 1.3 to 1.6 |

Under these conditions a good oil continues low fat spread was produced.

A comparative spread using in(wf(TUNA)f/POs) was attempted under the same conditions as those above. This could not be achieved using these conditions.

In order to achieve a good oil continues low fat spread, the votator had to be altered to the following conditions:
pump—Proportioning pump set at 40% (20 g/min.).
$A_1$ conditions—Shaft speed 1000 rpm—Temperature set at −7° C.
$C_1$ conditions—Shaft speed 1000 rpm—Temperature set to 4° C.
$A_2$ conditions—Shaft Speed 1000 rpm—Temperature set to −7° C.
$C_2$ conditions—Shaft speed 1000 rpm—Temperature set to 4° C.

Using these unit temperatures produced the following exit temperatures:

| Sample | $A_{1\ Exit}$ (° C.) | $C_{1\ Exit}$ (° C.) | $A_{2\ Exit}$ (° C.) | $C_{2\ Exit}$ (° C.) | Line Pressure bar |
|---|---|---|---|---|---|
| in (wf(TUNA)f/POs) | 4.3 | 12.5 | 3.0 | 10.2 | 1.4 to 2.7 |

Evaluations were done on C-value and on conductivity. The C-value in g/cm$^2$ of the spreads was measured by using a cone penetrometer. The conductivity in $\mu$ siemens/cm was measured by using a Wayne Kerr.

| | 5° C. |
|---|---|
| Sample | C-value |
| in(wf(TUNA)f/BO68) | 440 |
| in(wf(TUNA)f/POs) | <90 |

The spread made with in(wf(TUNA)f/POs) was too soft to enable us to measure a C-value.

EXAMPLE IX

Range style dressings were made according to the following recipe:

|  | wt % |
| --- | --- |
| Liquid oil | 25.0 |
| Maltodextrin | 20.0 |
| Dried egg yolk | 0.8 |
| Xanthum gum | 0.4 |
| Vinegar | 5.0 |
| Water | 44.8 |

In above recipe two different liquid oils were applied. The liquid oil for the reference was Sunflower oil and the liquid oil according to the invention was as follows:

Sunflower oil/in(D40/BO68) 90/10

The FAME results of the in(D40/BO68) are listed in table 15. Results of the NMR measurements of the blend according to the invention are listed in table 17.

A large batch of aqueous phase was manufactured and used for all the dressings. The water and maltodextrin were first blended using a Silverson mixer. The egg yolk, xanthum gum and vinegar were sequentially added whilst continuing to stir with the Silverson until complete mixing had occurred. At this stage the pH=3.25, therefore no further adjustment to the pH was made.

The oils were slowly added to the aqueous phase whilst mixing using the Silverson. Mixing was continued until all the oil had been dispersed. The dressings were transferred to 200 ml plastic sterile bottles.

The viscosities of the samples were determined using a Brookfield Viscometer fitted with a number 4 spindle rotating at 10 rpm. The samples were contained in identical 200 ml plastic bottles hence the viscosities are directly comparable with each other. For each sample the average of three measurements was taken with the sample being allowed to relax for 1 minute between each 1 minute of shear. The viscosity results of the dressings are listed in table 20.

The oil droplet size distribution was determined using a Malvern Mastersizer using a 45 mm filter. The results of these measurements, as Sauter-mean particle diameter are listed in table 20.

EXAMPLE X

Spreads were made according to the following recipe:

| Fat Phase | |
| --- | --- |
| Fat Blend | 40% |
| Hymono 7804 | 0.3% |
| Colour (2% β-carotene) | 0.02% |
| Total | 40.32% |
| Aqueous Phase (to pH 5.1) | |
| Water | 56.44% |
| Skimmed Milk Powder | 1.5% |
| Gelatin (270 bloom) | 1.5% |
| Potassium Sorbate | 0.15% |
| Citric Acid Powder | 0.07% |
| Total | 59.66% |

In above recipe two different fat blends were applied. The fat blend for the reference was HS1/Sunflower oil 13/87 and the fat blend according to the invention was as follows:

HS1/Sunflower oil/in(D40/BO68) 13/77/10

The FAME results of the in(D40/BO68) are listed in table 15. Results of the NMR measurements of the blend according to the invention are listed in table 17.

The spreads were processed according to the following procedure:

2 kg of material was prepared and processed.

A micro-votator processing line was set up as follows:

Premix conditions—Stirrer Speed 60 rpm—Temperature 50° C.

pump—Proportioning pump set at 60% (30 g/min.).

$A_1$ conditions—Shaft speed 1000 rpm—Temperature set at 8° C.

$C_1$ conditions—Shaft speed 1000 rpm—Temperature set to 10° C.

$A_2$ conditions—Shaft Speed 1000 rpm—Temperature set to 10° C.

$C_2$ conditions—Shaft speed 1000 rpm—Temperature set to 13° C.

The aqueous phase was prepared by heating the required amount of water to approximately 80° C. and then, using a silverson mixer, slowly mixing in the ingredients. The pH of the system was adjusted to 5.1 by adding 20% Lactic acid solution as required.

A premix was prepared by stirring the fat phase in the premix tank and then slowly adding in the aqueous phase. When addition was complete, the mix was stirred for a further 5 minutes before pumping through the line. When the process had stabilised (around 20 minutes), product was collected for storage and evaluation.

The typical process conditions were as follows:

| Sample | $A_1$ Exit (° C.) | $C_1$ Exit (° C.) | $A_2$ Exit (° C.) | $C_2$ Exit (° C.) | Line Pressure (bar) |
| --- | --- | --- | --- | --- | --- |
| Reference | 13.2 | 18.7 | 13.6 | 15.6 | 0.5 to 2 |
| HS1/SF/ in (D40/ BO68) 13/77/10 | 12.2 | 18.6 | 13.4 | 15.0 | 1 to 3 |

For both systems, very good oil continuous low fat spreads were produced using this system.

Evaluations were done on C-value and on conductivity. The C-value in g/cm² of the spreads was measured by using a cone penetrometer. The conductivity in $\mu$ siemens/cm was measured by using a Wayne Kerr.

| | 20° C. | |
| --- | --- | --- |
| Sample | C-value | Conductivity |
| Reference | 190 | $10^{-5}$ |
| HS1/SF/ in (D40/ BO68) | 130 | $10^{-5}$ |

All samples spread very easily on grease-proof paper, with no obvious signs of water loss.

EXAMPLE XI

Ice cream was made according to the following recipe:

|  | wt % |
| --- | --- |
| Fat blend | 10.0 |
| Skimmed milk powder | 10.0 |
| Icing sugar | 12.0 |
| Corn syrup solids | 4.0 |

-continued

| | wt % |
|---|---|
| Dextrose monohydrate | 2.0 |
| Sherex IC 9330 ® | 0.6 |
| Water | 61.4 |
| Total | 100.0 |

Sherex IC 9330® is a product from Quest International and comprises mono- and diglycerides admixed with different stabilizers.

In above recipe two different fat blends were applied. The fat blend for the reference was PO/Sunflower oil 90/10 and the fat blend according to the invention was as follows:

PO/in(D40/BO68) 90/10

The FAME results of the in(D40/BO68) are listed in table 15. Results of the NMR measurements of the blend according to the invention are listed in table 17.

All ingredients except the water and the fat were mixed. Then the cold water was added to this mixture. This mixture was heated in a water bath till a temperature of 70° C. Then the fully liquid palm oil was added to the mixture while "stirred" in the ultra-turrax. This emulsion was cooled in a water bath at 20° C. untill a temperature of 30° C. was reached. The emulsion was stirred in the ultra-turrax again.

The batch ice cream machine was held for 24 hours at −28° C. prior to use. The emulsion was placed in the batch ice cream machine and stirred for 15 minutes. The resulting ice cream was stored at −20° C. for 24 hours and then evaluated.

The viscosity of the ice cream emulsion, prior to freezing was measured. The overrun and hardness were determined. The viscosity was measured by using the Haake viscometer. Hardness was measured by using a Stevens texture analyser with a 45° cone at a speed of 0.5 mm/second till a deepness of 2 mm.

| Sample | Overrun (%) | Hardness (gram) |
|---|---|---|
| Reference | 31.5 | 142 |
| PO/in(D40/BO68) | 42.7 | 141.4 |

The viscosities of the emulsions were similar.

TABLE 2

FAME data for the components used

| FAME | Semi refined tuna oil | wf(TUNA)f | BO68 | POs |
|---|---|---|---|---|
| C12:0 | 0.1 | 0.0 | 0.1 | 0.0 |
| C12:other | 0.0 | 0.0 | 0.0 | 0.0 |
| C14:0 | 3.5 | 1.7 | 0.2 | 0.8 |
| C14:other | 1.6 | 0.3 | 0.0 | 0.0 |
| C16:0 | 20.8 | 3.1 | 13.8 | 91.8 |
| C16:1 | 5.4 | 7.6 | 0.0 | 0.1 |
| C16:others | 4.7 | 3.2 | 0.2 | 0.1 |
| C18:0 | 6.1 | 0.6 | 83.7 | 3.8 |
| C18:1 | 14.8 | 16.1 | 0.8 | 2.6 |
| C18:2 | 1.2 | 3.1 | 0.1 | 0.6 |
| C18:3 | 0.7 | 0.9 | 0.0 | 0.0 |
| C18:others | 1.9 | 1.7 | 0.0 | 0.0 |
| C20:0 | 0.4 | 0.0 | 0.6 | 0.2 |
| C20:1 | 1.1 | 1.1 | 0.0 | 0.0 |

TABLE 2-continued

FAME data for the components used

| FAME | Semi refined tuna oil | wf(TUNA)f | BO68 | POs |
|---|---|---|---|---|
| C20:2 | 0.0 | 0.2 | 0.0 | 0.0 |
| C20:3 | 0.0 | 0.0 | 0.0 | 0.0 |
| C20:4 | 0.0 | 0.0 | 0.0 | 0.0 |
| C20:5 | 5.1 | 12.0 | 0.0 | 0.0 |
| C20:others | 3.1 | 4.0 | 0.0 | 0.0 |
| C22:0 | 0.0 | 0.0 | 0.3 | 0.0 |
| C22:1 | 0.3 | 0.0 | 0.0 | 0.0 |
| C22:5 | 1.5 | 2.1 | 0.0 | 0.0 |
| C22:6 | 24.8 | 39.6 | 0.0 | 0.0 |
| C22:others | 2.9 | 2.8 | 0.0 | 0.0 |
| C24:0 | 0.0 | 0.0 | 0.1 | 0.0 |
| Others | 0.0 | 0.0 | 0.0 | 0.0 |
| Total | 100.0 | 100.0 | 99.9 | 100.0 |

TABLE 3

Programm check on a chemical interesterification

| FAME | wfPOs/PKs (blend) | in(wfPOs/PKs) | Calculated by statistical programm |
|---|---|---|---|
| C8:0(%) | 0.6 | 0.6 | |
| C10:0(%) | 1.1 | 1.1 | |
| C12:0(%) | 22.5 | 22.5 | |
| C14:0(%) | 10.0 | 9.9 | |
| C16:0(%) | 50.2 | 50.5 | |
| C17:0(%) | 0.1 | 0.1 | |
| C18:0(%) | 4.3 | 4.3 | |
| C18:1(%) | 9.9 | 10.0 | |
| C18:2(%) | 0.6 | 0.7 | |
| C20:0(%) | 0.3 | 0.3 | |
| C22:0(%) | 0.1 | 0.0 | |
| Carbon number | | | |
| C28 | 0.1 | 0.0 | 0.0 |
| C30 | 0.2 | 0.0 | 0.0 |
| C32 | 1.4 | 0.4 | 0.2 |
| C34 | 2.7 | 0.7 | 0.4 |
| C36 | 11.5 | 3.3 | 2.5 |
| C38 | 10.4 | 4.2 | 3.4 |
| C40 | 6.4 | 12.7 | 11.4 |
| C42 | 4.1 | 12.3 | 11.7 |
| C44 | 2.4 | 21.9 | 22.1 |
| C46 | 3.7 | 17.0 | 17.8 |
| C48 | 30.5 | 15.5 | 17.0 |
| C50 | 21.7 | 9.0 | 10.2 |
| C52 | 3.8 | 2.5 | 2.9 |
| C54 | 1.1 | 0.4 | 0.3 |
| C56 | 0.1 | 0.1 | 0.0 |
| C58 | 0.1 | 0.0 | 0.0 |

TABLE 4

FAME data for example II

| FAME | TUNAf/BO68 (blend) | in (TUNAf/BO68) | TUNAf/POs (blend) | in (TUNAf/POs) |
|---|---|---|---|---|
| C12:0 | 0.1 | 0.1 | 0.0 | 0.0 |
| C12:other | 0.0 | 0.0 | 0.0 | 0.0 |
| C14:0 | 1.5 | 1.6 | 1.7 | 1.8 |
| C14:other | 0.5 | 0.6 | 0.6 | 0.4 |
| C16:0 | 14.8 | 14.9 | 34.9 | 36.3 |

TABLE 4-continued

FAME data for example II

| FAME | TUNAf/ BO68 (blend) | in (TUNAf/ BO68 | TUNAf/ POs (blend) | in (TUNAf/ POs) |
|---|---|---|---|---|
| C16:1 | 4.4 | 4.7 | 4.3 | 4.9 |
| C16:other | 2.4 | 2.6 | 2.3 | 2.5 |
| C18:0 | 26.6 | 27.1 | 7.3 | 7.7 |
| C18:1 | 10.4 | 11.3 | 10.5 | 11.9 |
| C18:2 | 1.2 | 1.1 | 1.9 | 2.1 |
| C18:3 | 0.6 | 0.6 | 0.6 | 0.5 |
| C18:other | 1.6 | 1.5 | 0.8 | 0.8 |
| C20:0 | 0.2 | 0.2 | 0.1 | 0.1 |
| C20:1 | 0.7 | 0.8 | 0.8 | 0.9 |
| C20:2 | 0.3 | 0.2 | 0.2 | 0.2 |
| C20:3 | 0.2 | 0.2 | 0.2 | 0.1 |
| C20:4 | 1.6 | 1.5 | 1.5 | 1.5 |
| C20:5 | 6.3 | 5.8 | 6.2 | 5.5 |
| C20:other | 0.6 | 0.6 | 0.6 | 0.6 |
| C22:0 | 0.1 | 0.1 | 0.1 | 0.0 |
| C22:1 | 0.3 | 0.3 | 0.3 | 0.1 |
| C22:5 | 1.2 | 1.1 | 1.2 | 1.1 |
| C22:6 | 23.0 | 21.5 | 21.9 | 19.3 |
| C22:other | 1.7 | 1.7 | 1.9 | 1.7 |
| C24:0 | 0.0 | 0.0 | 0.0 | 0.0 |
| Total | 100.3 | 99.8 | 99.9 | 100.0 |

TABLE 5

Carbon number data for example II

| Carbon number | TUNAf/ BO68/POs 70/20/5 (blend) | in (TUNAf/ BO68/POs) 70/20/5 | TUNAf/ POs/BO68 70/20/5 (blend) | in (TUNAf/ POs/BO68) 70/20/5 |
|---|---|---|---|---|
| C36 | 0.2 | 0.2 | 0.0 | 0.0 |
| C38 | 0.3 | 0.3 | 0.0 | 0.0 |
| C40 | 0.4 | 0.3 | 0.0 | 0.0 |
| C42 | 0.6 | 0.6 | 0.0 | 0.0 |
| C44 | 0.7 | 0.8 | 0.0 | 0.0 |
| C46 | 1.2 | 1.3 | 0.8 | 1.5 |
| C48 | 7.9 | 4.3 | 26.6 | 12.3 |
| C50 | 6.2 | 10.9 | 5.7 | 15.0 |
| C52 | 14.3 | 18.0 | 5.9 | 14.8 |
| C54 | 27.9 | 19.6 | 11.8 | 16.3 |
| C56 | 11.9 | 17.0 | 10.3 | 12.6 |
| C58 | 11.3 | 12.7 | 12.0 | 9.4 |
| C60 | 10.0 | 8.1 | 12.9 | 10.2 |
| C62 | 6.1 | 5.2 | 14.0 | 7.9 |
| C64 | 1.0 | 0.7 | 0.0 | 0.0 |
| C66 | 0.0 | 0.0 | 0.0 | 0.0 |
| C68 | 0.0 | 0.0 | 0.0 | 0.0 |
| Total | 100.0 | 100.0 | 100.0 | 100.0 |

TABLE 6

Calculated data for example II of the amount of C14 + which are bonded on a triglyceride molecule with L1 and/or L2
70/20/5 wf(tuna)f/BO68/POs

| Carbon number | Analyzed (wt %) | Calculated (wt %) | M/P/S + X (wt %) + L1/L2 | M/P/S + M/P/S (wt %) + L1/L2 | M/P/S wt % | wt % of the total added amount C14 + bonded on a molecule with L1 and/or L2 |
|---|---|---|---|---|---|---|
| C36 | 0.2 | 0.0 | 0.0 | 0.0 | 0.0 | 0.0 |
| C38 | 0.3 | 0.0 | 0.0 | 0.0 | 0.0 | 0.0 |
| C40 | 0.3 | 0.0 | 0.0 | 0.0 | 0.0 | 0.0 |
| C42 | 0.6 | 0.0 | 0.0 | 0.0 | 0.0 | 0.0 |
| C44 | 0.8 | 0.1 | 0.0 | 0.0 | 0.0 | 0.0 |
| C46 | 1.3 | 0.6 | 0.0 | 0.0 | 0.0 | 0.0 |
| C48 | 4.3 | 3.0 | 0.0 | 0.0 | 0.0 | 0.0 |
| C50 | 10.9 | 8.9 | 0.0 | 0.0 | 0.0 | 0.0 |
| C52 | 18.0 | 15.6 | 0.6 | 1.0 | 0.8 | 1.8 |
| C54 | 19.6 | 18.1 | 3.6 | 3.6 | 3.3 | 7.5 |
| C56 | 17.0 | 19.2 | 6.2 | 6.3 | 5.8 | 13.2 |
| C58 | 12.7 | 16.2 | 6.6 | 4.4 | 4.8 | 11.0 |
| C60 | 8.1 | 8.8 | 5.4 | 0.0 | 1.5 | 3.5 |
| C62 | 5.2 | 7.0 | 4.1 | 0.0 | 1.2 | 2.7 |
| C64 | 0.7 | 1.4 | 0.0 | 0.0 | 0.0 | 0.0 |
| C66 | 0.0 | 1.2 | 0.0 | 0.0 | 0.0 | 0.0 |
| Total | 100.0 | 100.1 | | | 0.0 | 39.8 | x = all fatty acids except M, P and S (C14:0, C16:0 and C18:0)
/ = or

TABLE 7

Analyzed results of example II of the amount of
C14 + which are bonded on a triglyceride molecule
with L1 and/or L2.

| | HPLC band | Band as % TAGs (g/100 g) | Sum of Cno's containing target TAG in band (% wt) | Sum of target acids in band (% wt) | Target acids in target TAGs in band (g/100 g) | Target acids in total FAME on TG (% wt) | Therefore target acids in target TAGs (% wt on total FAME) |
|---|---|---|---|---|---|---|---|
| in(TUNAf BO69/POs) 70/20/5 | A | 31.7 | 96.0 | 44.0 | 13.4 | 43.6 | 30.7 |
| | B | 32.3 | 46.0 | 19.2 | 2.9 | 43.6 | 6.5 |
| | | | | | | Total: | 37.3 |

TABLE 8

FAME data for example III

| FAME | TUNAf/ BO68 (blend) | in (TUNAf/ BO68) | TUNAf/ POS (blend) | in (TUNAf/ POs) |
|---|---|---|---|---|
| C12:0 | 0.1 | 0.1 | 0.1 | 0.1 |
| C12:other | 0.1 | 0.1 | 0.1 | 0.0 |
| C14:0 | 1.3 | 1.3 | 1.5 | 1.6 |
| C14:other | 0.5 | 0.5 | 0.5 | 0.5 |
| C16:0 | 5.0 | 5.2 | 26.8 | 30.0 |
| C16:1 | 5.3 | 5.3 | 5.3 | 5.7 |
| C16:other | 2.6 | 2.6 | 2.5 | 2.7 |
| C18:0 | 21.8 | 23.3 | 1.2 | 1.3 |
| C18:1 | 12.6 | 12.5 | 12.3 | 13.3 |
| C18:2 | 1.4 | 1.4 | 1.5 | 1.5 |
| C18:3 | 0.8 | 0.8 | 0.8 | 0.8 |
| C18:other | 2.1 | 2.0 | 2.1 | 1.8 |
| C20:0 | 0.1 | 0.1 | 0.0 | 0.1 |
| C20:1 | 0.7 | 0.7 | 0.7 | 0.8 |
| C20:2 | 0.2 | 0.2 | 0.2 | 0.2 |
| C20:3 | 0.2 | 0.2 | 0.2 | 0.2 |
| C20:4 | 2.0 | 1.9 | 1.9 | 1.8 |
| C20:5 | 8.6 | 8.2 | 8.5 | 7.6 |
| C20:other | 1.0 | 0.9 | 0.9 | 0.8 |
| C22:0 | 0.1 | 0.1 | 0.0 | 0.0 |
| C22:1 | 0.2 | 0.2 | 0.2 | 0.2 |
| C22:5 | 1.4 | 1.4 | 1.4 | 1.3 |
| C22:6 | 30.0 | 29.1 | 29.5 | 26.0 |
| C22:other | 2.0 | 1.9 | 1.9 | 1.7 |
| C24:0 | 0.0 | 0.0 | 0.0 | 0.0 |
| Total | 99.8 | 100.0 | 100.1 | 100.0 |

TABLE 9

Carbon number data for example III

| Carbon number | TUNAf/ BO68 (blend) | in(TUNAf/ BO68) | TUNAf/ POs (blend) | in(TUNAf/ POs) |
|---|---|---|---|---|
| C38 | 0.0 | 0.1 | 0.0 | 0.0 |
| C40 | 0.0 | 0.1 | 0.0 | 0.2 |
| C42 | 0.1 | 0.2 | 0.0 | 0.3 |
| C44 | 0.2 | 0.4 | 0.3 | 0.6 |
| C46 | 0.4 | 0.9 | 1.5 | 2.1 |
| C48 | 1.0 | 2.0 | 24.4 | 12.3 |
| C50 | 3.7 | 5.3 | 5.6 | 13.8 |
| C52 | 12.5 | 12.3 | 5.2 | 12.7 |
| C54 | 26.1 | 18.0 | 8.1 | 14.7 |
| C56 | 13.1 | 18.1 | 12.4 | 13.4 |
| C58 | 15.4 | 16.7 | 14.5 | 10.8 |
| C60 | 13.8 | 12.3 | 13.4 | 11.2 |
| C62 | 9.4 | 10.2 | 10.4 | 5.6 |
| C64 | 3.3 | 2.8 | 3.3 | 2.0 |
| C66 | 1.0 | 0.6 | 0.9 | 0.3 |
| C68 | 0.0 | 0.0 | 0.0 | 0.0 |
| Total | 100.0 | 100.0 | 100.1 | 100.0 |

TABLE 10

Calculated data of example III of the amount of
C14 + which are bonded on a triglyceride molecule
with L1 and/or L2.
75/25   wf(tuna)f/BO68

| Carbon number | Analyzed (wt %) | Calculated (wt %) | M/P/S + X (wt %) + L1/L2 | M/P/S + M/P/S (wt %) + L1/L2 | M/P/S wt % | wt % of the total added amount C14 + bonded on a molecule with L1 and/or L2 |
|---|---|---|---|---|---|---|
| C36 | 0.0 | 0.0 | 0.0 | 0.0 | 0.0 | 0.0 |
| C38 | 0.1 | 0.0 | 0.0 | 0.0 | 0.0 | 0.0 |
| C40 | 0.1 | 0.0 | 0.0 | 0.0 | 0.0 | 0.0 |
| C42 | 0.2 | 0.0 | 0.0 | 0.0 | 0.0 | 0.0 |

TABLE 10-continued

Calculated data of example III of the amount of C14 + which are bonded on a triglyceride molecule with L1 and/or L2.
75/25 wf(tuna)f/BO68

| Carbon number | Analyzed (wt %) | Calculated (wt %) | M/P/S + X (wt %) + L1/L2 | M/P/S + M/P/S (wt %) + L1/L2 | M/P/S wt % | wt % of the total added amount C14 + bonded on a molecule with L1 and/or L2 |
|---|---|---|---|---|---|---|
| C44 | 0.4 | 0.0 | 0.0 | 0.0 | 0.0 | 0.0 |
| C46 | 0.9 | 0.3 | 0.0 | 0.0 | 0.0 | 0.0 |
| C48 | 2.0 | 1.2 | 0.0 | 0.0 | 0.0 | 0.0 |
| C50 | 5.3 | 4.0 | 0.0 | 0.0 | 0.0 | 0.0 |
| C52 | 12.3 | 9.3 | 0.3 | 0.4 | 0.3 | 1.1 |
| C54 | 18.0 | 14.7 | 2.5 | 1.3 | 1.6 | 5.2 |
| C56 | 18.1 | 17.9 | 6.6 | 3.7 | 4.3 | 14.6 |
| C58 | 16.7 | 20.8 | 8.9 | 4.6 | 5.6 | 18.7 |
| C60 | 12.3 | 13.1 | 6.0 | 0.0 | 1.8 | 5.9 |
| C62 | 10.2 | 12.7 | 6.4 | 0.0 | 1.9 | 6.2 |
| C64 | 2.8 | 3.3 | 0.0 | 0.0 | 0.0 | 0.0 |
| C66 | 0.6 | 2.8 | 0.0 | 0.0 | 0.0 | 0.0 |
| Total | 100.0 | 100.1 | | | | 51.7 | x = all fatty acids except M, P and S (C14:0, C16:0 and C18:0)
/ = or

TABLE 11

Analyzed results of example III of the amount of C14 + which are bonded on a triglyceride molecule with L1 and/or L2.

| | HPLC band | Band as % TAGs (g/100 g) | Sum of Cno's containing target TAG in band (% wt) | Sum of target acids in band (% wt) | Target acids in target TAGs in band (g/100 g) | Target acids in total FAME on TG (% wt) | Therefore target acids in target TAGs (% wt on total FAME) |
|---|---|---|---|---|---|---|---|
| in(TUNAf BO68/POs) | A | 31.9 | 74.4 | 30.2 | 7.2 | 28.7 | 25.0 |
| | B | 38.4 | 49.0 | 10.8 | 2.0 | 28.7 | 7.1 |
| | | | | | | Total: | 32.1 |

TABLE 12

FAME data for example IV

| FAME | D58 | in(D58/BO68) |
|---|---|---|
| C14:0 | 0.1 | 0.1 |
| C14:other | 0.5 | 0.3 |
| C16:0 | 0.1 | 3.6 |
| C16:1 | 1.0 | 0.7 |
| C16:other | 3.4 | 2.4 |
| C18:0 | 0.2 | 26.8 |
| C18:1 | 0.9 | 1.5 |
| C18:2 | 1.8 | 1.4 |
| C18:3 | 0.8 | 0.5 |
| C18:other | 3.5 | 2.3 |
| C20:0 | 0.0 | 0.2 |
| C20:1 | 0.1 | 0.0 |
| C20:2 | 0.0 | 0.0 |
| C20:3 | 0.4 | 0.4 |
| C20:4 | 4.6 | 3.3 |
| C20:5 | 16.1 | 10.8 |
| C20:other | 1.4 | 1.1 |
| C22:0 | 0.0 | 0.1 |
| C22:1 | 0.1 | 0.0 |
| C22:5 | 2.0 | 1.4 |
| C22:6 | 27.3 | 39.3 |
| C22:other | 5.6 | 3.8 |
| C24:0 | 0.0 | 0.0 |
| Total | 99.9 | 100.0 |

TABLE 13

Carbon number data for example IV

| Carbon number | D58/BO68 (blend) | in (D58/BO68) |
|---|---|---|
| C36 | 0.0 | 0.6 |
| C38 | 0.0 | 1.7 |
| C40 | 0.0 | 1.9 |
| C42 | 0.6 | 3.3 |
| C44 | 1.5 | 1.8 |
| C46 | 1.9 | 1.9 |
| C48 | 1.0 | 0.7 |
| C50 | 3.7 | 2.3 |
| C52 | 14.4 | 5.0 |
| C54 | 32.2 | 10.7 |
| C56 | 5.2 | 14.8 |
| C58 | 7.3 | 19.9 |
| C60 | 10.8 | 14.7 |
| C62 | 10.3 | 12.6 |
| C64 | 7.3 | 5.5 |
| C66 | 3.8 | 2.6 |
| C68 | 0.0 | 0.0 |
| Total | 100.0 | 100.0 |

TABLE 15

FAME data for example V

| FAME | D40 | in (D40/BO68) |
|---|---|---|
| C12:0 | 0 | 0 |
| C12:other | 0 | 0 |
| C14:0 | 4 | 2 |
| C14:other | 1 | 0 |
| C16:0 | 7 | 8 |
| C16:1 | 4 | 3 |
| C16:other | 0 | 2 |
| C18:0 | 2 | 31 |
| C18:1 | 16 | 11 |
| C18:2 | 1 | 1 |
| C18:3 | 1 | 0 |
| C18:other | 2 | 2 |
| C20:0 | 0 | 0 |
| C20:1 | 2 | 1 |
| C20:2 | 0 | 0 |
| C20:3 | 0 | 0 |
| C20:4 | 0 | 1 |
| C20:5 | 7 | 5 |
| C20:other | 2 | 0 |
| C22:0 | 0 | 0 |

TABLE 14

Calculated data of example IV of the amount of C14+ which are bonded on a triglyceride molecule with L1 and/or L2.
75/25 fish oil concentrate (= D58) / BO68

| Carbon number | Anaylzed (wt %) | Calculated (wt %) | M/P/S + X (wt %) + L1/L2 | M/P/S/ + M/P/S (wt %) + L1/L2 | M/P/S wt % | wt % of the total addded amount c14+ bonded on a molecule with L1 and/or L2 |
|---|---|---|---|---|---|---|
| C32 | 0.0 | 0.0 | 0.0 | 0.0 | 0.0 | 0.0 |
| C34 | 0.0 | 0.0 | 0.0 | 0.0 | 0.0 | 0.0 |
| C36 | 0.6 | 0.0 | 0.0 | 0.0 | 0.0 | 0.0 |
| C38 | 1.7 | 0.0 | 0.0 | 0.0 | 0.0 | 0.0 |
| C40 | 1.9 | 0.0 | 0.0 | 0.0 | 0.0 | 0.0 |
| C42 | 3.3 | 0.0 | 0.0 | 0.0 | 0.0 | 0.0 |
| C44 | 1.8 | 0.0 | 0.0 | 0.0 | 0.0 | 0.0 |
| C46 | 1.9 | 0.0 | 0.0 | 0.0 | 0.0 | 0.0 |
| C48 | 0.7 | 0.1 | 0.0 | 0.0 | 0.0 | 0.0 |
| C50 | 2.3 | 0.8 | 0.0 | 0.0 | 0.0 | 0.0 |
| C52 | 5.0 | 3.1 | 0.0 | 0.0 | 0.0 | 0.0 |
| C54 | 10.7 | 7.5 | 1.2 | 0.8 | 0.9 | 3.0 |
| C56 | 14.8 | 12.7 | 3.7 | 4.9 | 4.2 | 14.2 |
| C58 | 19.9 | 20.4 | 6.0 | 8.7 | 7.2 | 24.2 |
| C60 | 14.7 | 18.0 | 12.2 | 0.0 | 3.6 | 12.1 |
| C62 | 12.6 | 21.4 | 14.7 | 0.0 | 4.3 | 14.3 |
| C64 | 5.5 | 5.5 | 0.0 | 0.0 | 0.0 | 0.0 |
| C66 | 2.6 | 7.6 | 0.0 | 0.0 | 0.0 | 0.0 |
| Total | 100.0 | 100.1 | | | | 67.8 | x = all fatty acids except M, P and S (C14:0, C16:0 and C18:0)
/ = or

TABLE 15-continued

FAME data for example V

| FAME | D40 | in (D40 / BO68) |
|---|---|---|
| C22:1 | 3 | 2 |
| C22:5 | 4 | 3 |
| C22:6 | 38 | 26 |
| C22:other | 2 | 2 |
| C24:0 | 0 | 0 |

TABLE 16

Carbon number data for example V

| Carbon number | D40 / BO68 (blend) | in (D40 / BO68) |
|---|---|---|
| C42 | 0.3 | 0.4 |
| C44 | 1.9 | 1.2 |
| C46 | 1.7 | 1.9 |
| C48 | 1.8 | 2.2 |
| C50 | 4.9 | 6.0 |
| C52 | 14.0 | 12.0 |
| C54 | 27.9 | 19.0 |
| C56 | 10.5 | 17.4 |
| C58 | 10.4 | 19.7 |
| C60 | 10.7 | 9.5 |
| C62 | 9.0 | 9.2 |
| C64 | 3.8 | 1.6 |
| C66 | 3.1 | 0.0 |
| C68 | 0.0 | 0.0 |
| Total | 100.0 | 100.1 |

TABLE 18

FAME data for example VII.

| FAME | wf (TUNA) f/POs | wf (TUNA) f/BO68 |
|---|---|---|
| C12:0 | 0.1 | 0.1 |
| C14:0 | 1.9 | 1.7 |
| C14:other | 0.6 | 0.6 |
| C16:0 | 24.7 | 6.9 |
| C16:1 | 5.3 | 5.3 |
| C16:other | 2.8 | 2.8 |
| C18:0 | 1.8 | 24.5 |
| C18:1 | 15.1 | 12.8 |
| C18:2 | 2.0 | 1.4 |
| C18:3 | 0.8 | 0.8 |
| C18:4 | 1.1 | 1.0 |
| C18:other | 0.8 | 0.8 |
| C20:0 | 0.1 | 0.2 |
| C20:1 | 0.9 | 0.8 |
| C20:2 | 0.2 | 0.2 |
| C20:3 | 0.2 | 0.2 |
| C20:4 | 1.9 | 1.9 |
| C20:5 | 6.8 | 6.7 |
| C20 other | 0.9 | 0.7 |
| C22:0 | 0.0 | 0.1 |
| C22:1 | 0.3 | 0.2 |
| C22:5 | 1.3 | 1.3 |
| C22:6 | 28.0 | 26.7 |
| Other C22 | 2.5 | 2.3 |

TABLE 17

N-values for blends example VI

| Application | Blend | N-5 n.s (%) | N-10 n.s. (%) | N-20 n.s. (%) | N-35 n.s. (%) |
|---|---|---|---|---|---|
| Chocolate | Typical values | 85–95 | 80–95 | 55–65 | <1 |
|  | 99/1 CCB / in (D40/BO68) | 89.7 | 86.2 | 60.3 | 0.0 |
| Bakery | Typical values | 40–80 | 30–75 | 20–45 | <15 |
|  | 40/50/10 POf37 / dfPOf / in (D40/BO68) | 61.5 | 43.9 | 25.7 | 0.4 |
| Ice cream coatings | Typical values | 65–90 | <35 | <15 | <1 |
|  | 90/5/5 CN / CNs / in (D40/BO68) | 76.4 | 63.2 | 36.0 | 0.1 |
| Ice cream | Typical values | 40–60 |  | 15–30 | <5 |
|  | 90/10 PO/in(D40/BO68) | 52.3 |  | 22.8 | 4.2 |
| Non dairy creams | Typical values | 1–70 |  | 0–37 | 0–11 |
|  | 40/40/20 nPOm / dfPOf / in (D40/BO68) | 55.5 |  | 15.2 | 0.0 |
| Health margarines/ Health spreads | Typical values | 7–20 |  | 3–12 | <2.5 |
|  | 13/77/10 HS1 / SF / in (D40/BO68) | 18.9 |  | 11.9 | 2.5 |
| Confectionery filling | Typical values | >50 | >40 | >25 | <1.5 |
|  | 60/20/20 nPOm / dfPOf / in (D40/BO68) | 65.6 | 55.4 | 32.9 | 1.2 |
| Mayonnaise / Sauces | Typical values | 0–10 | 0–5 | <1 | 0.5 |
|  | 90/10 SF/in (D40/BO68) | 1.0 | 0.7 | 0.4 | 0.1 |
| Dressings | Typical values | 0–10 | 0–5 | <1 | <0.5 |
|  | 90/10 SF/ in (D40/BO68) | 1.0 | 0.7 | 0.4 | 0.1 |

TABLE 19

Carbon number data for example VII.

| Carbon Number (area %) | wf (TUNA) f / POs | | wf (TUNA) f / BO68 | |
|---|---|---|---|---|
| | Blend | Interesterified blend | Blend | Interesterified blend |
| C42 | 0.6 | 0.8 | 0.2 | 0.6 |
| C44 | 0.2 | 1.1 | 0.5 | 1.0 |
| C46 | 2.1 | 2.0 | 0.7 | 1.2 |
| C48 | 19.3 | 6.2 | 2.1 | 2.3 |
| C50 | 10.5 | 12.7 | 4.4 | 7.8 |
| C52 | 7.9 | 12.3 | 13.4 | 11.9 |
| C54 | 9.3 | 17.3 | 28.0 | 17.2 |
| C56 | 12.2 | 15.7 | 12.8 | 18.4 |
| C58 | 13.4 | 11.7 | 14.3 | 17.8 |
| C60 | 12.9 | 11.8 | 12.3 | 10.9 |
| C62 | 8.0 | 5.7 | 8.1 | 8.4 |
| C64 | 3.5 | 2.7 | 3.2 | 2.5 |

TABLE 20

| OIL | VISCOSITY cP | SAUTER MEAN PARTICLE DIAMETER μM |
|---|---|---|
| Reference | 5940 | 19.30 |
| Sunflower oil/ in (D40/BO68) 90/10 | 5580 | 16.01 |

We claim:

1. A spread characterized by its improved hardness at 5° C., said spread being a fat continuous emulsion wherein the fat component of the spread contains an interesterified triglyceride-composition comprising at least two different long chain poly-unsaturated fatty acids $L_1$ and $L_2$, both having at least 3 unsaturations and having at least 20 carbon atoms from which $L_1$ is the most abundant and $L_2$ is the second most abundant, wherein the triglyceride composition contains at least 20 wt % of $L_1$, while the weight ratio $L_1:L_2$ is at least 2, and the triglyceride composition also contains at least 30 wt %, of saturated $C_{16}$–$C_{18}$ fatty acids and wherein the weight ratio of $C_{18:0}:C_{16:0}$ is >1.8; wherein at least 5 wt % of said saturated $C_{16}$–$C_{18}$ fatty acid residues is bonded on a triglyceride molecule, in which at least $L_1$ and/or $L_2$ is present.

2. Spread composition according to claim 1, wherein the amount of $L_1$ is more than 30 wt %, while the weight ratio $L_1:L_2$ is at least 3.

3. Spread composition according to claims 1 or 2, wherein the amount of $L_1$ is at least 40 wt % and the weight ratio of $L_1:L_2$ is at least 3.5.

4. Spread composition according to claim 1, wherein the amount of saturated $C_{16}$–$C_{18}$ fatty acids is 30–50 wt %.

5. Spread composition according to claim 1, wherein the amount of $C_{18}$ saturated fatty acid is more than 20 wt %.

6. Spread composition according to claim 1, wherein $L_1$=DHA (=$C_{22:6}$).

7. Spread composition according to claim 1, wherein $L_2$=EPA (=$C_{20:5}$).

8. Spread composition according to claim 1, wherein $L_1$=EPA and $L_2$=DHA.

9. A spread according to claim 1 wherein at least 10 wt % of the saturated $C_{16}$–$C_{18}$ fatty acid residues is bonded on a trigylceride molecule.

10. A spread according to claim 1 wherein at least 20 wt % of the saturated $C_{16}$–$C_{18}$ fatty acid residues is bonded on a trigylceride molecule.

11. Spread composition according to claim 1 containing blends of triglycerides comprising:

0.3–95 wt % of the interesterified triglyceride composition according to claim 1, and 99.7–5 wt % of a complementary fat, having a solid fat index (NMR-pulse; not stabilized) of more than 15 at 20° C.

12. Spread according to claim 11, comprising 5–80 wt % of the interesterified triglyceride composition, and 95–20 wt %, the complementary fat.

13. Spread according to claim 11, wherein said complementary fat has a solid fat content (NMR-pulse; not stabilized) of more than 20 at 20° C.

14. Spread according to claim 11, wherein said complementary fat is selected from the group consisting of cocoa butter equivalents, cocoa butter, palm oil or fractions thereof, palmkernel oil or fractions thereof, interesterified mixtures of above fats or fractions or hardened components thereof, or from liquid oils, such as sunflower oil, high oleic sunflower oil, soyabean oil, rapeseed oil, cottonseed oil, maize oil, safflower oil, high oleic safflower oil or MCT oils.

15. Spread according to claim 11, wherein said spread displays a solid fat content (NMR-pulse; not stabilized) of 0–85, at 5° C. and less than 30 at 35° C.

16. Spread compositions according to claim 1 or claim 11 wherein said spread contains an effective amount of an oxidation stabilizer, selected from the group consisting of natural or synthetic tocopherols, BHT, BHA, free radical scavengers, and enzymes with antioxidant properties.

17. A spread according to claim 11 comprising 20–70 wt % of the interesterified triglyceride composition and 80–30 wt % of the complementary fat.

* * * * *